United States Patent Office 2,921,110
Patented Jan. 12, 1960

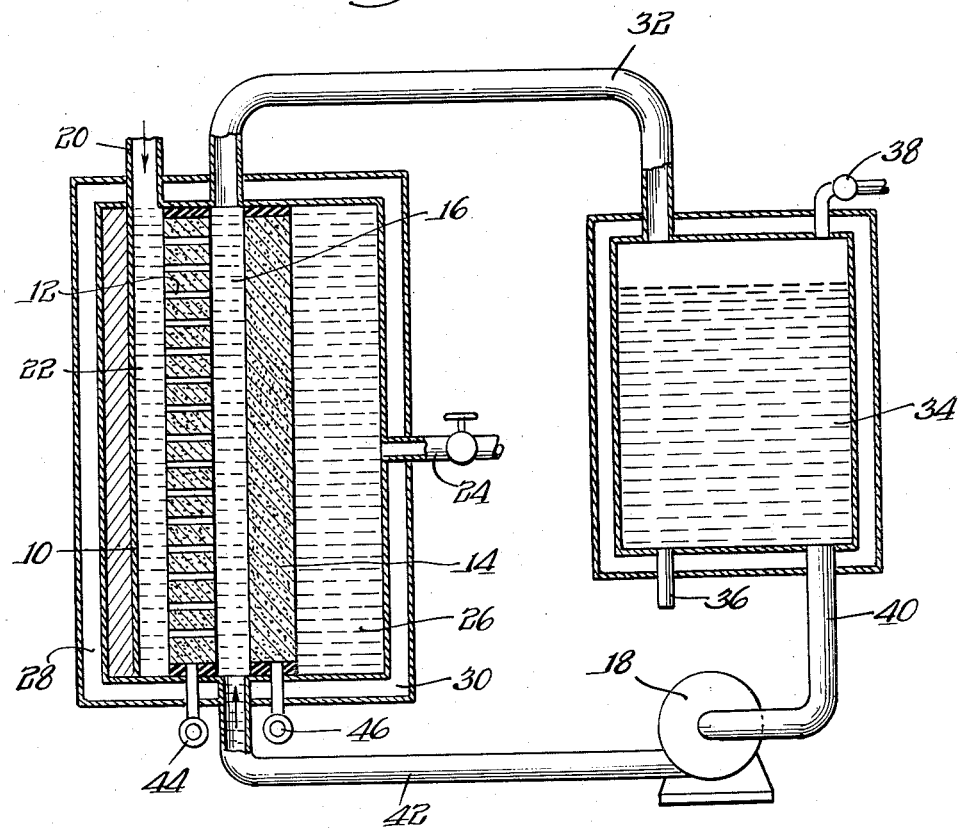

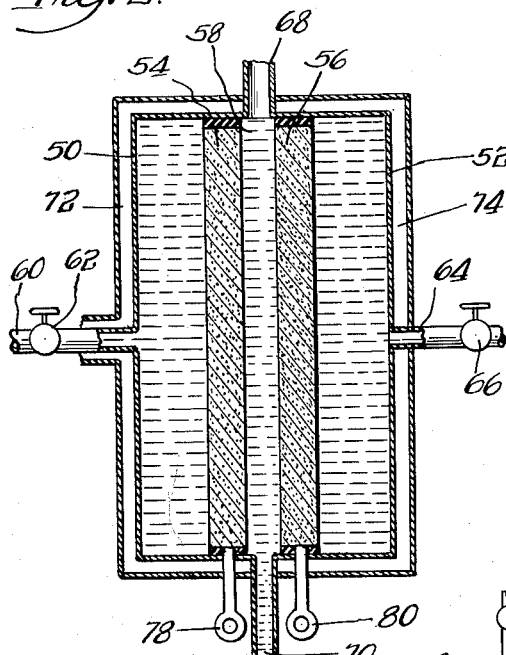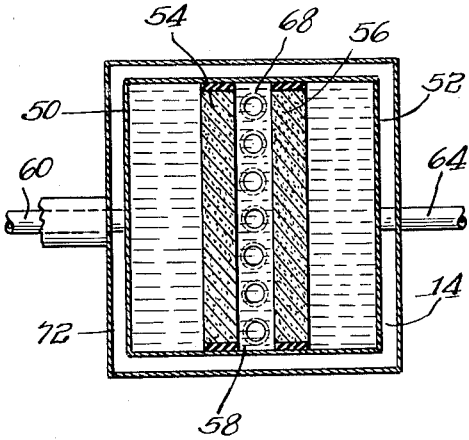

2,921,110

BATTERY CELLS

Clyde A. Crowley, Willmette, William M. Langdon, Algonquin, and Demetrios V. Louzos, Waukegan, Ill., assignors, by mesne assignments, to Graham, Savage and Associates, Inc., Kalamazoo, Mich., a corporation of Illinois Application May 1, 1953, Serial No. 352,342

6 Claims. (Cl. 136—86)

This invention relates to improvements in battery cells which are capable of delivering energy at high rates and over long periods of time. It enables the obtention of electrical energy at high efficiency rates by transformation of chemical energy in a novel and highly effective manner.

Battery cells may be divided into three broad categories. The first of these, which is also the most familiar, is that of static battery cells. These are cells which are illustrated by the Le Clanche dry cell and the lead-sulfuric acid storage battery which operate at low rates of electrical energy output as compared to the cells which are revealed in this invention. Furthermore, the operating life of such static battery cells is limited by virtue of the fixed quantities of active electrode components (oxidizing and reducing agents) held therein. Additional deficiencies of static battery cells which limit their usefulness include inability of removing the products of the electrochemical reaction upon discharge. The accumulation of these products within the static cells leads to increased internal resistance which further militates toward decreases in electrical energy output. All of these deficiencies seriously limit the use of static batteries for a variety of purposes, typical of such latter instances being as sources of large reserve power for flood lighting of isolated emergency landing fields and emergency starting of heavy mobile equipment.

A second category of battery cells is that of dynamic reserve cells. Examples of these are the silver chloride-magnesium battery and the magnesium-chromic acid-graphite battery. Much higher rates of electrical energy output are obtained from such batteries than from the previously described static cell batteries. However, the life of these dynamic reserve cells is limited by virtue of the fixed amounts of either one or both of the active electrode components present in the batteries.

The third category comprises so-called "fuel cells." This type of cell has been proposed to meet the defects which characterize conventional primary cells in relation to inability satisfactorily to operate them at high current drains. Among such fuel cells are the hydrogen-chlorine cell, the hydrogen-oxygen cell, and the so-called "air cell." All of such fuel cells have many important practical defects so that even the best of them has gone into only limited commercial use and in only limited environments.

The present invention encompasses the significant improvement in battery cells and obviates many of the deficiencies of and objectional features of the above categories of battery cells by making available completely dynamic battery cells which can operate for extreme periods of time by virtue of the throttled feed particularly of both active electrode components. In this respect, the present invention provides a significant improvement in energy conversion by permitting the direct conversion of chemical energy to electrical energy without the necessity of going through the usual conversion of chemical energy to heat energy to mechanical energy to electrical energy of all heat engines. In essence, the present invention provides an electrochemical energy converter of unparalleled efficiency.

Battery cells made in accordance with the present invention are, generally speaking, characterized by low internal resistances and, therefore, enable current to be drawn therefrom at relatively very high rates, the efficiency of the cells being extremely high. The transformation of chemical energy into electrical energy, generally speaking, involves the utilization of electrons available from ions. In cells made pursuant to the present invention, free electrons are made available from solutions of alkali metals or the like in liquid ammonia or other solvents employed at a rapid rate and this, coupled with the high mobility of the electrons in the liquid electrolytes utilized, as described below, contributes to a system where the rate of current drain is, to a very large extent, a function of the resistance of the external circuit.

In conventional cells or battery systems, the by-products of the chemical reactions as a result of which electrical energy is obtained accumulate in the cell or system. The effect thereof is that the ability of the cell or system to deliver electrical energy declines and the declination is at least to some extent, generally speaking, a function of the time of operation of the cell or system. In the case of cell systems to which the present invention relates, the products of the chemical reactions, which may be solids, liquids or gases, are more or less continuously removed by, for example in the case of solids, filtration, or other means is provided to prevent deleterious buildup of such reactants in the cell. The composition of the electrolyte is advantageously maintained substantially constant and, therefore, the output of the cell is essentially constant and the cell is capable of practically continuous operation at substantially maximum efficiency. Other and important advantages of cells made in accordance with the present invention will be pointed out below after a detailed description of the invention is given.

Cells operating, and constructed to operate, in accordance with our invention function analogously to a combustion engine except that the available energy is converted directly to electrical energy without the necessity of going through a low efficiency heat plus mechanical and/or electrical energy conversion cycle with the concomitant necessity for the utilization of such auxiliaries as a starting battery, generator, etc. Our invention makes possible highly efficient conversion to electrical energy which is obtained practically instantaneously upon demand, and, furthermore, without the use of complex auxiliaries. Battery systems made pursuant to our invention provide great flexibility of control and, therefore, make feasible a variety of practical applications for the power system. Their efficiency is almost entirely independent of such considerations as exhaust pressures which are a significant factor in other types of power systems.

In accordance with our invention, oxidants or reductants, and, especially, both oxidants and reductants, which may be of gaseous or liquid character, are introduced into a cell at a controlled rate or under throttled conditions, advantageously with continuous and rapid circulation of the liquid electrolyte and discharge of the waste or reaction products which are generated in the cell. Materials which are highly reactive with the electrolyte and which would normally react chemically to produce only heat can be utilized to produce electrical energy when employed under the conditions of the present invention. Either the oxidant or the reductant or both can be throttled into the cell at the desired controlled rate of flow, and the passing or circulation of the liquid electrolyte through the cell at a rapid speed, serve, in combination, to make possible high rates of power drain, for instance, of the order of 5 to 10 times or more as great as is possible with ordinary cells under short circuit. We utilize, as described hereafter in more detail, positive displacement pumps to remove gases generated in the cell as a result of reactions between the liquid electrolyte and the oxidant and/or reductant materials which are passed into the cell and commingle with the electrolyte therein.

The nature of our invention will be apparent in connection with the following description of illustrative embodiments of our invention which, as will be appreciated in the light of the guiding principles taught herein, can take numerous specific forms.

Fig. 1 is a vertical section of a cell arrangement pursuant to one illustrative embodiment of our invention, certain parts being shown schematically.

Figs. 2, 3 and 4 show another illustrative embodiment of our invention, Fig. 2 being a vertical sectional view of a cell, Fig. 3 being a horizontal sectional view of said cell, and Fig. 4 being a schematic view of a system utilizing said cell.

Referring now to the embodiment of Fig. 1, the reducing or negative electrode 10 comprises a hollow inert member, which may be made of a metal coated with a nonconductive paint or the like, which is provided with a plurality of apertures 12 therein through which a metal may be extruded. The apertures may be of varying size and number but good results are obtained, for instance, with apertures of about $\frac{1}{32}$ inch diameter spaced apart on $\frac{1}{2}$ inch centers. The oxidizing or positive electrode comprises a porous electrically conductive member 14 which may be made of porous carbon or a porous sintered structure prepared from a sintered inert metal such as tantalum impregnated with platinum black. An oxidizing agent such as air, gaseous oxygen or gaseous or liquid chlorine is forced under pressure through the porous electrode into effective proximity with the electrolyte in the cell chamber 16. If oxygen is used, it can conveniently be generated, as required, by the catalytic decomposition of hydrogen peroxide. The metal which is passed or extruded through the apertures 12 may be calcium, potassium or sodium or fused eutectics thereof or other metals as stated above, but sodium, either molten or solid, is particularly satisfactory.

The liquid electrolyte is advantageously molten sodium hydroxide monohydrate maintained at about 5 to about 10 degrees C. above its melting point. Other liquid electrolytes can be used as, for example, fused calcium hydroxides; fused halides of sodium, potassium and aluminum; and fused eutectic salt mixtures. It is not necessary that the liquid electrolyte be a fused product. It may, in certain cases, comprise saturated or substantially saturated aqueous solutions of such materials as sodium hydroxide or potassium hydroxide. It will be understood that the selection of the particular oxidizing agent will, at least to some extent, be governed by the particular electrolyte which is utilized. Thus, for example, if gaseous or liquid chlorine is used as the oxidizing agent, the electrolyte should be a fused halide as, for instance, molten sodium chloride. If air or gaseous oxygen is employed as the oxidizing agent, it is advantageous to use as the electrolyte a molten or saturated aqueous solution of a hydroxide as, for instance, molten sodium hydroxide or a saturated aqueous solution of sodium hydroxide. Of particular utility is a cell arrangement wherein the oxidizing agent is gaseous oxygen, the metal extruded through the apertures 12 is molten sodium, and the electrolyte is molten sodium hydroxide monohydrate. In use, the content of water of the monohydrate tends to decrease, the amount of such decrease depending in part on the temperature at which the cell is operated.

The electrolyte is continuously circulated by a pump 18 between the electrodes at a controlled rate, preferably at a linear velocity ranging between about 5 and about 50 or more ft. per second which we here consider as rapid. The metallic sodium or the like is passed through the apertures 12 at the rate of about 0.1 gram to about 0.5 gram or more per minute per square inch of effective area of the negative electrode, and the gaseous or liquid oxidizing agent is passed through the porous electrode 14 at the rate of about 0.05 to about 0.25 gram per minute per square inch of effective area of the positive electrode. It will be understood that the flow rates utilized will be governed by the current drain sought. Where, for instance, an aqueous sodium chloride electrolyte is utilized, and the reaction product formed during the operation of the cell is sodium chloride, the concentration of the sodium chloride in the electrolyte advantageously should be controlled to keep it substantially constant. This may readily be accomplished by the continual addition of make-up water and discharge of used electrolyte. It will be understood that, where used electrolyte is bled off, for instance, in the system sodium-sodium hydroxide monohydrate-oxygen, water will be added to the cell electrolyte to maintain the concentration substantially constant.

Referring, further, to Fig. 1, the molten sodium, for instance, is admitted under pressure through the inlet pipe 20 into the chamber 22 of the hollow electrode 10 and is forced or extruded through the apertures 12. The oxidizing agent, for instance, liquid chlorine is admitted under pressure through the inlet pipe 24 into chamber 26 and thence forced through electrode 14 into effective proximity with the electrolyte. The cell is jacketed, as shown at 28 and 30, to assist in maintaining the sodium or the like and the chlorine or the like at desired temperatures. The electrolyte continuously flows under pressure through the chamber 16 and then passes through outlet pipe 32 into a jacketed chamber 34 wherein excess or precipitated salts formed in the cell are filtered off from the electrolyte and discharged from the system through outlet 36. Any gases which are formed in the cell are discharged through pressure release valve 38 which is set to open at a predetermined pressure. The filtered electrolyte is returned for continuous repassage through the chamber 16 by means of pipe 40, pump 18 and pipe 42. Studs 44 and 46 are connected, respectively, to the electrodes 10 and 14, said studs being, in turn, adapted to be connected into the load circuit.

Current drains based upon the apparent area of the oxidizing electrode up to 300 amperes sq. ft. can be obtained at potentials over 1.5 volts. The effectiveness of the cell system depends mainly on the metal, particularly sodium, reaction, since enormous current drains per actual areas of metal, 30 to 40 amperes/sq. in., are drawn off. The direct reaction of the metal with the electrolyte is hereby minimized. Even under less than optimum conditions, Faraday efficiencies up to 85% have been obtained. As has heretofore been stated, the effectiveness of cell systems of the type here involved is dependent upon positive electrolyte circulation past the electrodes. This is to be distinguished sharply from static systems or systems which depend upon temperature or convection currents for circulation, it being impossible to obtain our results with any such latter types of systems.

In cells made in accordance with that embodiment of our invention shown in Figs. 2, 3 and 4, a closed or pressurized non-aqueous system is utilized which includes porous electrodes comprising, respectively, positive and negative electrodes spaced from each other and defining a first chamber. Within said chamber a liquid nitrogenous compound is maintained in contact with the inner surfaces of each of said electrodes. Said liquid nitrogenous compound must be of that type which is effective to strip a charge from an alkali metal. In operation, the liquid nitrogenous compound is passed continuously into and out of said first chamber and said operation should be so conducted that said first chamber is maintained essentially completely filled.

The cell includes positive and negative electrode compartments or chambers, one of said porous electrodes comprising the positive electrode being disposed in the positive electrode compartment or chamber, and the other of said porous electrodes comprising the negative electrode being disposed in the negative electrode compartment or chamber. Valved means is provided for continuously feeding, under pressure, a molten alkali metal into the negative electrode chamber and maintaining said molten alkali metal in contact with the outer surface of the negative electrode. In operation, the negative electrode chamber should be maintained full of molten alkali metal. Instead of using molten alkali metal as such, said alkali metal can be brought into the system as a dissolved "free-electron" alkali metal solution in liquid ammonia and can be produced, for example, by passing part of the electrolyte through a bed of lumps or pieces of the alkali metal. Valved means is also provided for continuously feeding into effective proximity with the electrolyte in the positive electrode chamber an oxidizing agent. The oxidizing agent must be of that type which reacts with said alkali metal to produce an alkali metal compound which is removable from the electrolyte, particularly an alkali metal compound which is insoluble in the liquid nitrogenous compound.

The insoluble alkali metal compound which forms in the first chamber during the operation of the cell is drawn out of said first chamber with the stream of liquid nitrogenous compound, is separated from said liquid nitrogenous compound by filtration or the like and removed or discharged from the system. The recovered liquid nitrogenous compound is led back into the system for repassage through said first chamber. Where liquid ammonia, sodium and chlorine are utilized, the end reaction product of the cell reaction is solid sodium chloride which, as stated, is removed from the system. However, during operation of the cell, it will be seen, in this particular instance, that the electrolyte comprises liquid ammonia containing sodium chloride, generally a substantially saturated solution of sodium chloride in liquid ammonia.

So far as the porous electrodes are concerned, it will, of course, be understood that they must be of such character as not to react or alloy destructively with the materials with which they are in contact during operation of the cell. In general, porous carbon or graphite is especially preferred for the positive electrode although porous sintered metal structures of iron, nickel and various other metals can be utilized, subject to the criterion set forth above. With respect to the negative electrode, porous graphite is particularly desirable but, as in the case of the positive electrode, phosphides such as iron phosphide, porous metal and alloy structures can be used provided that they are not acted upon adversely or destructively by the materials with which they are in contact during cell operation.

Liquid ammonia is especially advantageous as the liquid nitrogenous compound but, in the broader aspects of our invention, other liquid nitrogenous compounds can be employed so long as they are of the type which are effective to strip a charge from an alkali metal to produce an ion and so long as they do not contain reactive polar groups as, for example, hydroxy groups. Illustrative examples of others of such compounds are methyl amine, ethyl amine, and ethylene diamine.

While sodium is especially satisfactory for use in the battery cells of our invention, other alkali or alkaline earth metals or mixtures or combinations thereof which are soluble in liquid ammonia or other liquid nitrogenous compound selected and which dissolve in the liquid nitrogenous compound to furnish a free charge or electron and a positive ion of the metal can be employed. Illustrative examples are potassium, lithium, rubidium, cesium, calcium, barium and strontium. Aluminum, though not an alkali metal, can also be utilized to form the metal-free electron solutions. Said metals can be utilized in the form of molten liquids, liquid eutectic mixtures, liquid amalgams and, in certain instances, in the form of very finely divided slurries.

Chlorine, as a liquid, is especially preferred for use as the oxidizing agent in the battery cells of Figs. 2, 3 and 4 of our invention but other halogens, namely, bromine, fluorine and iodine are usable as well as interhalogen compounds such as iodine chlorides, iodine bromides, chlorine trifluoride, and, also, oxygen. The oxidizing agents can be used in gaseous as well as liquid form but, as indicated, liquid oxidizing agents, and particularly chlorine, are distinctly preferred. In certain cases, in order to increase efficient utilization of the chlorine, it may be reacted externally of the cell with ammonia to form chloramine which serves as the active oxidant. In such case, the chloramine is fed into the positive electrode chamber and thence through the porous positive electrode into effective proximity with the electrolyte in the electrolyte chamber. This procedure, however, has the disadvantage of reducing the available cell potential. If desired for any reason, the oxidizing agent, for instance, chlorine or oxygen, can be diluted with an inert gas such as nitrogen, helium, argon or the like, to decrease the speed of the reaction.

Referring, now, to the drawings, the cell proper of the second embodiment, as shown in Figs. 2 and 3, provides a negative electrode chamber 50, a positive electrode chamber 52, a porous negative electrode 54 and a porous positive electrode 56, disposed, respectively, in said negative electrode and positive electrode chambers and spaced from each other to form an electrolyte chamber 58 through which liquid ammonia or other liquid nitrogenous compound electrolyte preferably saturated with sodium chloride or the like is passed. An inlet port 60 provided with valve 62 serves to admit and control the flow of molten alkali metal into the negative electrode chamber or compartment 50, the latter being maintained filled with said molten alkali metal and, of course, in contact with the exposed surface of the porous negative electrode 54. The positive electrode chamber or compartment 52 is likewise provided with an inlet port 64 and valve 66 for admitting and controlling the flow of liquid chlorine or the like into the positive electrode chamber or compartment, the latter also being maintained filled and said liquid chlorine or the like is, of course, in effective proximity with the electrolyte at the exposed surface of the porous positive electrode 56.

The electrolyte chamber 58 is provided with a plurality of inlet and outlet ports 68 and 70, respectively, suitably controlled by valves (not shown). The cell is jacketed, as shown at 72 and 74, for the housing of heating media whereby, for example, to keep the alkali metal in a liquid state and to minimize heat losses.

Studs 78 and 80 are connected, respectively, to the electrodes 54 and 56, said studs being, in turn, adapted to be connected into the load circuit.

While we have shown a cell arrangement in which only single positive and negative electrodes are utilized, it will be understood, of course, that such is only illustrative and, if desired, each cell can include a plurality of such electrodes, associated chambers, etc.

In Fig. 4, which shows a schematic view of a system which utilizes the above described cell, it will be noted that the liquid ammonia, for example, is valved from cylinders through pipe 82 into a surge tank 84 from which it is delivered into the electrolyte chamber through port 68. The upper part of the surge tank 84 connects to a valve pipe 86 which leads to an inert gas tank or bottle (not shown), for example, nitrogen or helium, whereby to maintain the desired pressure in the surge tank.

The outlet ports 70, which may be connected into an intermediate header (not shown), lead into a continuous filter in which the excess sodium chloride, or other reaction product which forms and is insoluble in the electrolyte, is filtered off from the liquid ammonia or the like. The sodium chloride or the like is discharged from the system through port 88 and the recovered saturated solution of sodium chloride in liquid ammonia or the like passes through pipe 90 and is pumped by means of pump 92 through pipe 94 from where it is re-introduced into the electrolyte chamber 58 through port 68.

It will be understood, of course, that the output of cells made pursuant to our invention is dependent upon a number of factors over and above that determined by the selection of particular materials. Cell dimensions, electrode areas and rates of feed of the electrolyte and the like are pertinent factors. In general, for cells producing a high rate of current, it is desirable to utilize high flow rates for the electrolyte and substantial volume in the electrolyte or reaction chamber. For high drain cells, the concentration of $Na^+$ ions or other alkali metal ions in the electrolyte can be as high as about 40% to 45%, whereas in the case of low drain cells such concentrations can be in the range of about 5% to 10%. The flow rate of liquid ammonia is variable, being dependent, for instance, upon the electrode spacing and current density. By way of illustration, in a cell having 1 sq. ft. of electrode surface and wherein the electrodes are spaced about ½ inch apart, and operating at a drain of about 4 amperes per sq. in. of electrode surface area, a flow rate of the order of about 6 to about 12 feet per second of the liquid electrolyte past the electrodes is satisfactory. With closer electrode spacing and higher current densities, using, for example, 1 sq. ft. of electrode surface, the electrodes being spaced about 1/16 to 1/8 inch apart, and operating at a drain of about 20 amperes per sq. in. of electrode surface area, a flow rate of the order of about 20 to about 30 feet per second of the liquid electrolyte past the electrodes is satisfactory.

The pressure of feed of the molten alkali metal is also variable, being dependent, for example, on the viscosity of the molten alkali metal used, its temperature, the size of the cell, the porosity of the negative electrode, and the rate of reaction with the liquid nitrogenous compound electrolyte. In general, for small cells operating at a current drain of 4 to 10 amperes per sq. in. of negative electrode surface area, good results are obtained with a feed pressure of about 75 to 150 pounds per sq. in. With large cells, operating at high current densities, say from 25 to 100 amperes per sq. in., feed pressures of from about 200 to several thousand pounds per sq. in. are utilized.

The rate of halogen feed is likewise variable, being dependent upon a number of factors akin to those indicated above in relation to the feed of the alkali metal. If a gaseous halogen or like agent is used in the positive electrode compartment, for low current density operations pressures up to about 10 pounds per sq. in. are satisfactory, and for high current density operations pressures up to 100 pounds per sq. in. are utilized. Where the halogen used is in liquid form, as, for example, liquid chlorine, as is particularly preferred, for low current density operations the liquid chlorine can be fed under a pressure of about 50 to 100 pounds per sq. in. The rate of feed is, of course, dependent upon the area of electrode surface, the rate of feed of the molten alkali metal, and upon other factors including the nature of the current drain sought. The variabilities are within the control of the operator depending upon the specific results desired as will be apparent to those versed in the art in the light of the disclosures contained herein.

Cells made in accordance with our invention operate to produce high voltages, varying from about 1 to about 4 volts per cell, the exact voltage depending upon the particular components selected for operation of the system and upon the other variable factors mentioned above. This is in sharp contrast to ordinary aqueous battery systems in which the voltage is largely limited by the decomposition potential of water and by overvoltage considerations.

It is also to be observed that, with cells made in accordance with our present invention, variable rates of power demand can be met simply by controlling the rate of introduction of the reactants into the cell. This is distinctly different from the situation with most battery systems which react at a constant rate regardless of the energy which is being utilized as electrical energy and do not permit rate control through control of reactants being fed into the cell.

In the particularly preferred embodiments of our invention, sodium, chlorine, oxygen and ammonia are utilized. These materials are inexpensive and are available in practically inexhaustible quantities. The long range economic value of cells of the type with which our invention deals represents still another important advantage thereof since they do not require the utilization of materials which are scarce, relatively inaccessible and costly.

Following the teachings of our invention, numerous types of cells can readily be constructed. Thus, for instance, cells can be made with zinc or magnesium or cadmium as the negative electrode and graphite as the positive electrode, and saturated solutions of zinc chloride, magnesium chloride and cadmium chloride, respectively, as the electrolyte, the latter being positively circulated between and in contact with said electrodes, chlorine being passed into effective proximity with the circulating electrolyte. With such a system, high drain rates are obtainable, and it has been found that the chlorine in solution while in contact with both electrodes is activated to a much greater extent, of the order of 50-fold, at the graphite electrode than at the zinc, magnesium or cadmium electrode surfaces.

Cells or batteries made following teachings of our present invention will function with both the oxidant and reductant being introduced directly into the electrolyte. The electrodes should be so chosen as to be selective, that is, one of the electrodes should have a much greater activation for one reactant than for the other and vice versa. Simple oxidants and reductants are not the only types which can be used in systems of the present invention. In general, oxidizing agents dissolved in the electrolyte are usually simple ions, for instance, chloride, bromide, iodides, and oxygen. In systems encompassed by the preesnt invention, oxidizing agents of various types are capable of use. Thus, for example, chromic oxide ($CrO_3$), which is activated by a graphite electrode can be used. Through a similar use of an intermediate simple ion such as chlorine, bromine or iodine, such oxidants as alkali metal and ammonium persulfates, iodates, periodates, chlorates, perchlorates, bromates, permanganates (in acid solutions), hypochlorates and the like can be employed. Various of such oxidants react very rapidly in solution to liberate atomic and/or molecular chlorine. This chlorine, which is dissolved in the electrolyte, is available for rapid reaction. Free chlorine involves large film resistance for the solution process although the main oxidant itself is relatively inactive at the electrode surface itself.

What we claim as new and desire to protect by Letters Patent of the United States is:

1. A battery comprising a system including a cell, said cell having an electrode comprising a member selected from the group consisting of alkali and alkaline earth metals, and a porous electrically conductive electrode, said electrodes being spaced from each other, a molten electrolyte in said cell and in contact with said electrodes, said molten electrolyte comprising sodium hydroxide, means for passing said molten electrolyte through said cell at a controlled rate, and means for passing an oxidizing agent into effective proximity with said electrolyte through said porous electrically conductive electrode.

2. A battery comprising a system including a cell, said cell including an inert electrode provided with a plurality of apertures therein and a porous electrically conductive electrode, said electrodes being spaced from each other, a liquid electrolyte in said cell and in contact with said electrodes, said liquid electrolyte comprising sodium hydroxide containing an amount of water corresponding to that not exceeding the monohydrate, a pump for circulating said liquid electrolyte through said cell at a controlled rate, means for forcing metallic sodium through the apertures of said first-mentioned electrode into contact with said electrolyte, and means for forcing a gaseous oxygen-containing oxidizing agent into effective proximity with said electrolyte through said porous electrically conductive electrode.

3. A battery comprising a system including a cell, said cell having a hollow inert electrode provided with a plurality of apertures therein and a porous electrically conductive electrode, said electrodes being spaced from each other, a molten electrolyte in said cell and in contact with said electrodes, said molten electrolyte comprising sodium hydroxide in which any water present does not exceed that corresponding to the monohydrate, a pump for circulating said molten electrolyte through said cell at a controlled rate, means for passing at least one of the group consisting of an alkali and an alkaline earth metal into contact with said electrolyte through the apertures of said first-mentioned electrode, and means for passing an oxidizing agent into effective proximity with said electrolyte through said porous electrically conductive electrode.

4. A battery comprising a system including a cell, said cell having a hollow inert electrode provided with a plurality of apertures therein and a porous electrically conductive electrode, said electrodes being spaced from each other, a molten electrolyte in said cell and in contact with said electrodes, said molten electrolyte comprising sodium hydroxide in which any water present does not exceed that corresponding to the monohydrate, a pump for circulating said molten electrolyte through said cell at a controlled rate, means for passing metallic sodium into contact with said electrolyte through the apertures of said first-mentioned electrode, and means for passing an oxygen-containing gaseous oxidizing agent into effective proximity with said electrolyte through said porous electrically conductive electrode.

5. A battery comprising a system including a cell, said cell comprising at least in part an inert electrode and a porous electrically conductive electrode, said electrodes being spaced from each other, a liquid electrolyte in said cell and in contact with said electrodes, said liquid electrolyte comprising sodium hydroxide, a pump for circulating said liquid electrolyte through said cell at a controlled rate, means for bringing at least one of the group consisting of an alkali and an alkaline earth metal into contact with said electrolyte at said first-mentioned electrode, means for forcing a gaseous oxygen-containing oxidizing agent into effective proximity with said electrolyte through said porous electrically conductive electrode, and means for withdrawing from said cell reaction products formed therein.

6. A battery comprising a system including a cell, said cell having an inert electrode provided with a plurality of apertures therein and a porous electrically conductive electrodes, said electrodes being spaced from each other, a molten electrolyte in said cell and in contact with said electrodes, said molten electrolyte comprising a member selected from the group consisting of alkali halide and hydroxide, a pump for circulating said molten electrolyte through said cell at a controlled rate, means for extruding alkali metal through the apertures of said first-mentioned electrode into contact with said electrolyte, means for forcing a member selected from the group consisting of gaseous and liquid oxidizing agents into effective proximity with said electrolyte through said porous electrically conductive electrode, and means for withdrawing from said cell reaction products formed therein.

References Cited in the file of this patent

UNITED STATES PATENTS

| | | |
|---|---|---|
| 592,782 | Hess | Nov. 2, 1897 |
| 898,055 | MacMillan | Sept. 8, 1908 |
| 963,852 | Benko | July 12, 1910 |
| 2,102,701 | Gyuris | Dec. 21, 1937 |

FOREIGN PATENTS

| | | |
|---|---|---|
| 14,050 | Great Britain | June 13, 1911 |